United States Patent
Davis et al.

(10) Patent No.: US 7,296,116 B2
(45) Date of Patent: *Nov. 13, 2007

(54) METHOD AND APPARATUS FOR PROVIDING HIGH DENSITY STORAGE

(75) Inventors: Mark Charles Davis, Durham, NC (US); Richard Victor Kisley, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 226 days.

This patent is subject to a terminal disclaimer.

(21) Appl. No.: 10/777,529

(22) Filed: Feb. 12, 2004

(65) Prior Publication Data

US 2005/0182898 A1    Aug. 18, 2005

(51) Int. Cl.
*G06F 12/00* (2006.01)

(52) U.S. Cl. .................................................... 711/114
(58) Field of Classification Search .................... 711/4, 711/114; 710/37; 714/7; 361/685
See application file for complete search history.

(56) References Cited

U.S. PATENT DOCUMENTS

| | | | |
|---|---|---|---|
| 4,811,275 A | 3/1989 | Balogh, Jr. et al. | |
| 5,367,669 A * | 11/1994 | Holland et al. | ................. 714/7 |
| 5,398,158 A | 3/1995 | Fisher et al. | |
| 5,423,046 A | 6/1995 | Nunnelley et al. | |
| 5,455,934 A * | 10/1995 | Holland et al. | ................. 711/4 |
| 5,687,089 A | 11/1997 | Deyesso | |
| 5,768,623 A * | 6/1998 | Judd et al. | ..................... 710/37 |
| 5,777,845 A * | 7/1998 | Krum et al. | ................. 361/685 |
| 5,895,493 A | 4/1999 | Gatica | |
| 5,974,503 A | 10/1999 | Venkatesh et al. | |
| 6,112,276 A | 8/2000 | Hunt et al. | |
| 6,301,640 B2 | 10/2001 | Barve et al. | |
| 6,483,660 B1 | 11/2002 | Akagi et al. | |

FOREIGN PATENT DOCUMENTS

| | | |
|---|---|---|
| EP | 0 125 920 | 11/1984 |
| EP | 0560529 A2 | 9/1993 |
| GB | 2266615 A | 11/1993 |
| JP | 11282636 A | 2/2001 |
| JP | 2002073393 A | 3/2002 |
| WO | WO 9718553 A1 | 5/1997 |

OTHER PUBLICATIONS

IBM Technical Disclosure Bulletin, vol. 37, No. 12, Dec. 1994, pp. 525-527.

* cited by examiner

*Primary Examiner*—Pierre Bataille
*Assistant Examiner*—Paul Schlie
(74) *Attorney, Agent, or Firm*—David W. Lynch; Chambliss, Bahner & Stophel PC

(57) ABSTRACT

A method and apparatus for providing high-density storage is disclosed. A plurality of storage devices is aggregated in a package. A package-level controller is coupled to a carrier housing holding a plurality of storage devices, wherein the package-level controller provides a RAID logical configuration at a package-level for the storage devices held in the carrier housing. A controller may also be provided for virtualizing the logical addresses as at least one aggregate volume to provide a layer of abstraction to the storage devices. The package may be inserted into a storage system designed to manage multiple packages.

15 Claims, 7 Drawing Sheets

METHOD AND APPARATUS FOR PROVIDING HIGH DENSITY STORAGE

CROSS-REFERENCE TO RELATED APPLICATIONS

This application is related to the following co-pending and commonly-assigned patent application, which is hereby incorporated herein by reference in its respective entirety: "METHOD AND APPARATUS FOR AGGREGATING STORAGE DEVICES" to Davis et al., having application Ser. No. 10/777,531.

BACKGROUND OF THE INVENTION

1. Field of the Invention

This invention relates in general to storage devices and more particularly to a method and apparatus for providing high-density storage.

2. Description of the Prior Art

Information is rapidly becoming the most valuable asset of most companies. At the same time, managing and protecting information is becoming dramatically more complex and difficult due to the explosion in data storage requirements and the shift from centralized to distributed storage of data on enterprise networks. In addition, users are storing more and more data on their desktop and laptop computers. The exploding storage requirements are continually outgrowing the storage capacity of servers and workstations. As a result, storage capacity must be continually updated, which is costly and disruptive to users.

Magnetic storage is a popular means of storage because stored data persists even without a continual source of electricity, and because this type of data storage is affordable for many applications. Magnetic storage is frequently implemented on a more massive scale. For example, some storage systems aggregate a large number of storage devices into a single storage system within a single enclosure, utilizing control electronics, power supplies, cooling features, and other infrastructure that is common to all drives in the system. Further, such storage devices may encounter performance constraints. For example, such performance constraints may be related to server processing speeds, hard disk drive (HD) access rates, limitations on areal density of the storage media and the storage networking link speed. Historical solutions to these problems included shrinking HD platter sizes to allow greater spindle speeds, although this solution is reaching the level of diminishing returns, and grouping HDs using redundant arrays of inexpensive disks (RAIDs), and other technologies to place segments of sequentially addressed data at similar places on multiple HD platters, and on multiple HDs (using RAID striping).

Currently, hard disk array enclosures in the area of enterprise-class disk array architecture are dominated by 3.5-inch form factor drives, stacked on their sides in a row of 10-15 HDs. Each HD is housed in a carrier (HDC), which protects the drive during normal handling and allows guided insertion of the HD into a storage system, allowing the rear connectors to link up properly to the storage system. Today, HDCs each hold 1 HD and are housed in a storage system having power aggregation, heat dissipation aggregation and storage network connection sharing. In a storage system multiple power supplies (usually 2) are aggregated and made available to each HDC and to the electronics of the storage system. Heat is dissipated from the storage system by arranging HDs in a larger storage system, 3U high (1U=1.75 inches) by 19 inches wide, so that large fans can be placed at the rear of the storage system to allow cooling of the HDs. Storage systems use storage network connection sharing because each HD can only access data at a fraction of the potential bandwidth of the connection to the storage network. Therefore, HDs are placed on a network internal to the storage system. The storage system has a small number of connections, typically two, to the storage network. Although both connections are used for performance, one is essentially a backup in case the other one has a link failure. Typically, HDs are addressable through the storage system connections, although some storage systems enhance the enclosure electronics to provide Redundant Arrays of Inexpensive Disks (RAID). This offers logical disks through the storage system connections, which are internally mapped to the physical disks.

Aggregating HDCs does not overcome the previously mentioned performance problems of server processing speeds, areal density of HD storage media and storage networking link speed. In attempting to solve these problems, attention must be paid to cost per gigabyte in implementing solutions. HDs offer "x" gigabytes of storage in a finite amount of space, for a finite amount of power, with a finite complexity of connection, and as a result cost per gigabyte is impacted by the challenges of space utilization, power needs and heat dissipation, and electrical connection.

Space utilization affects cost per gigabyte because designing and implementing the DE incurs cost. Where currently available DEs are used, design and implementation costs may be eliminated thereby eliminating the space utilization factor related to DE design and implementation in calculating cost per gigabyte. Further, when extra space is needed to house additional storage, cost per gigabyte is affected. However, if the same amount of space can be used to store a greater amount of storage, then space utilization cost per gigabyte is reduced.

HDs require an amount of power to operate. With an increasing amount of power used in a space, there is an increased amount of heat generated in that space, both affecting cost. HDs generally need to run continuously because an idle HD has a higher probability of failure proportional to idle time. As a result of the necessity for HDs to be continuously active, heat is continuously generated. But, excessive heat destroys electronic media and reduces the reliability of managing electronics. Thus, the amount of power used by the HD directly incurs cost, and compensating for heat generation, by implementing cooling fans for example, incurs cost by its use of power and increase in design complexity. Each of these factors directly increases cost per gigabyte for the storage system.

Electrical connections like parallel ATA and parallel SCSI HD connections involve 40+ pins per HD. Fibre Channel uses fewer pins but has its own connectivity challenges and cannot be implemented at a low cost. The complexity of the electrical connectivity directly impacts cost per gigabyte by increasing the design/implementation cost of the storage system.

It can be seen that there is a need for a method and apparatus for providing high-density storage.

SUMMARY OF THE INVENTION

To overcome the limitations in the prior art described above, and to overcome other limitations that will become apparent upon reading and understanding the present specification, the present invention discloses a method and apparatus for providing high-density storage.

Embodiments of the present invention solve the above-mentioned problems by provides a RAID logical configuration at a package-level for storage devices held in a carrier housing. A controller may also virtualize the logical addresses as at least one aggregate volume to provide a layer of abstraction to the storage devices. The package may be inserted into a storage system designed to manage multiple packages.

In one embodiment of the present invention, a package for providing high-density storage is provided. The package includes a carrier housing for holding multiple storage devices and a package-level RAID controller, coupled to the carrier housing, the package-level RAID controller providing a RAID logical configuration at a package-level for the storage devices held in the carrier housing.

In another embodiment of the present invention, another package for providing high-density storage is provided. This package includes a carrier housing for holding multiple storage devices proximate to one another and aligned in a row and a controller, coupled to the carrier housing, the controller configured to virtualize logical addresses of the multiple storage devices as at least one aggregate volume to provide a layer of abstraction to the storage devices.

In another embodiment of the present invention, a package-level RAID controller is provided. The package-level RAID controller includes memory for storing data therein and a processor, coupled to the memory, the processing being configured for providing a RAID logical configuration at a package-level for storage devices held in a carrier package In another embodiment of the present invention, a package controller is provided. The package controller includes memory for storing data therein and a processor, coupled to the memory, the processing being configured for virtualizing logical addresses of the multiple storage devices as at least one aggregate volume to provide a layer of abstraction to the storage devices.

In another embodiment of the present invention, a storage system is provided. The storage system includes a plurality of packages for providing high density storage, each package comprising a carrier housing for holding multiple storage devices and a package-level RAID controller, coupled to the carrier housing, for providing a RAID logical configuration at a package-level for storage devices held in a package, an enclosure for holding the plurality of the packages for providing high-density storage, a package aggregator, coupled to the plurality of packages, the package aggregator providing connections to each of the plurality of packages for power, control and signaling and a system level controller, coupled to the plurality of packages, for implementing a desired storage system configuration.

In another embodiment of the present invention, a storage system is provided. The storage system includes a plurality of packages for providing high density storage, each package comprising a carrier housing for holding multiple storage devices proximate to one another and aligned in a row and a package controller, coupled to the carrier housing, for virtualizing logical addresses of the multiple storage devices as at least one aggregate volume to provide a layer of abstraction to the storage devices, an enclosure for holding the plurality of the packages for providing high-density storage, a package aggregator, coupled to the plurality of packages for providing high density storage, the package aggregator providing connections to each of the plurality of packages for power, control and signaling and a system level controller, coupled to the plurality of packages, for implementing a desired storage system configuration.

In another embodiment of the present invention, a package is provided. The package includes means for holding multiple storage devices and means, coupled to the means for holding, for providing a RAID logical configuration at a package-level for the storage devices held in the means for holding.

In another embodiment of the present invention, another package is provided. This package includes means for holding multiple storage devices proximate to one another and aligned in a row and means, coupled to the means for holding, for virtualizing logical addresses of the multiple storage devices as at least one aggregate volume to provide a layer of abstraction to the storage devices.

In another embodiment of the present invention, a method for providing a high-density storage package is provided. The method includes providing a carrier housing for holding multiple storage devices and providing a RAID logical configuration at a package-level for the storage devices held in the carrier housing.

In another embodiment of the present invention, a method for providing a high-density storage package is provided. This method includes providing a carrier housing for holding multiple storage devices proximate to one another and aligned in a row and virtualizing logical addresses of the multiple storage devices as at least one aggregate volume to provide a layer of abstraction to the storage devices.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing high-density storage to allow greater SD aggregation in a storage system of a predetermined size. The package also houses a controller for providing a RAID logical configuration at a package-level for the storage devices held in the carrier housing. A controller may also be provided for virtualizing the logical addresses as at least one aggregate volume to provide a layer of abstraction to the storage devices. The package may be inserted into a storage system designed to manage multiple packages.

Figure 1:
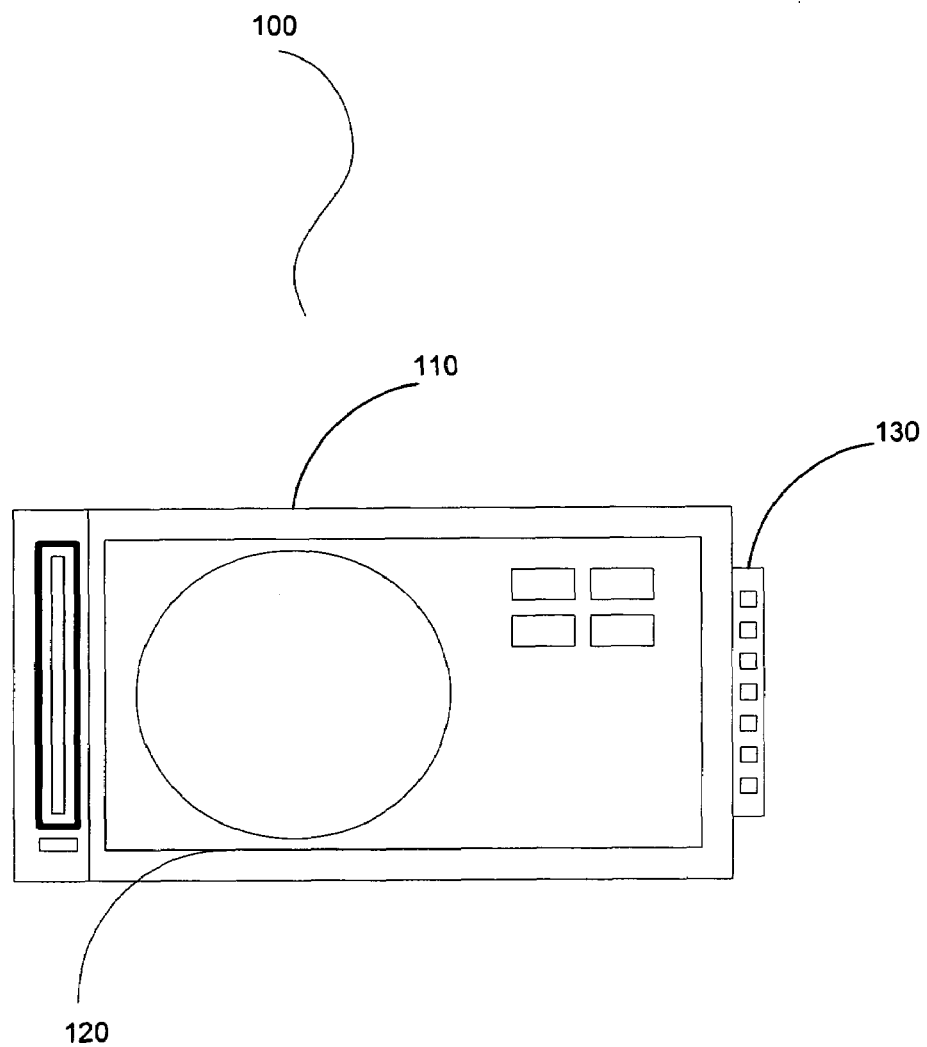
FIG. 1 is a view of a single hard disk drive (HD) carrier having a casing, a HD and an external connector.

FIG. 1 is a view of a single hard disk drive (HD) carrier 100 having casing 110, HD 120 and external connector 130. External connector 130 protrudes from the casing 110 allowing the HD carrier 100 to be connected to external devices such as a disk enclosure (DE) (not shown).

Figure 2:
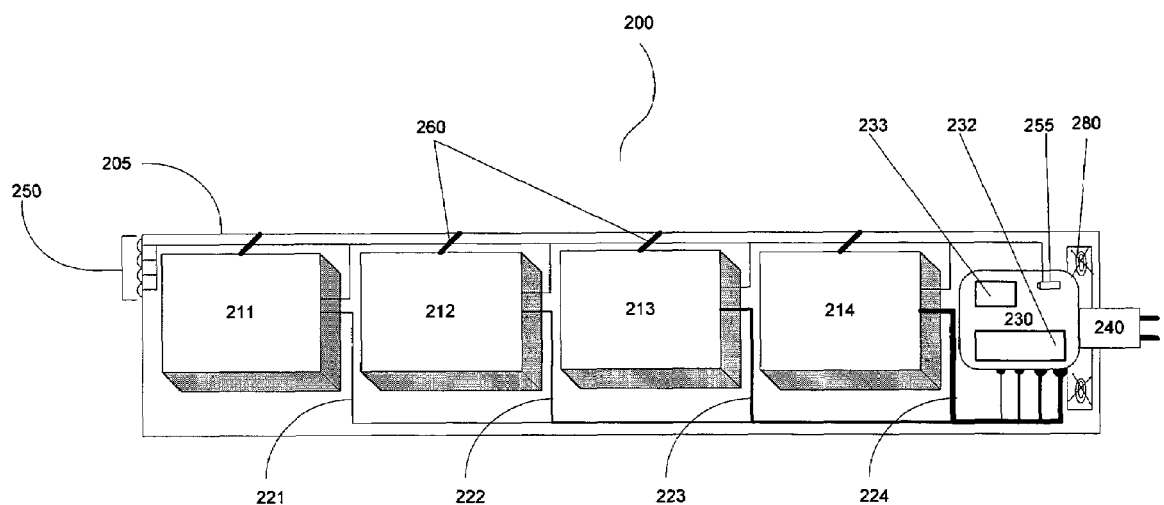
FIG. 2 is a drawing illustrating package having a carrier housing, four storage devices (SDs), carrier housing SD connectors, controller, an external connector and a cooling device in accordance with an embodiment of the present invention.

FIG. 2 is a drawing illustrating package 200 having a carrier housing 205, four SDs 211, 212, 213 and 214, carrier housing SD connectors 221, 222, 223 and 224, package controller 230, external connector 240 and cooling device 280 in accordance with an embodiment of the present invention. In the example provided in FIG. 2, package 200 houses four SDs 211-214 having horizontal placement in carrier housing 205. SDs 211-214 are each connected to package controller 230 via carrier housing SD connectors 221-224. Package controller 230 includes a processor 232 and a memory 233 for virtualizing logical addresses of the multiple SDs 211-214 as at least one aggregate volume to provide a layer of abstraction to the SDs 211-214. Package controller 230 may also make the aggregate volume of virtual addresses to appear as one unit to external devices.

Package 200 in accordance with the present invention may include several configurations. For example, package 200 may be configured for the replacement of a single SD upon SD failure by pulling the package from the storage system and swapping the failed SD with a new SD. The package may be fitted with failure/activity indication lights 250, one for each SD 211-214 for easily determining whether a SD is faulty. Such lights may be battery-powered 255. The package may be designed to allow partial population, where not all of the available SD spaces are used. The package may be further designed to include cooling fans 280 for SD heat dissipation. Another embodiment of the present invention includes mounting spring-loaded brackets 260 in the package to hold each SD in place. This ensures the stability of the package during handling and reduces stress on the SD connectors. Brackets may be mounted from the top of the package and swing down over the SD, locking in place after SD insertion. Alternatively, the bracket could be part of the structural housing, which protects the connectors at the rear of each SD position in the package allowing the bracket to swing laterally over against the SD after insertion and lock in place.

A myriad of storage devices 211-214 with varying storage capacities can be used in embodiments of the present invention. For example, 2.5-inch form factor serial ATA or serial SCSI disk drives may be used. Another example SD that may be used is the larger 3.5-inch form factor SD.

Storage capacities of each of the above-described SDs vary. With continuous advancements in technology, the amount of storage available for 2.5-inch form factor serial ATAs, for example, is increasing and is currently available with a 120 gigabyte storage capacity. However, the present invention is not meant to be limited to any particular form factor, storage capacity number of SDs in a carrier, the orientation of the SDs or of any other storage device characteristic Connecting SDs 211-214 to package controller 230 is accomplished using carrier housing SD connectors 221-224. Several types of connectors may be used to connect SDs 211-214 to package controller 230 including: serial advanced technology attachment (SATA) hard drive interconnects, SATA-2 interconnects, serial attached SCSI (SAS) technology, and arbitrated loop or switched Fibre Channel (FC). SATA cables are thinner than parallel ATA and use a 7-pin data connector instead of a 40-pin data connector. SATA cables use low-voltage differential signaling, consistent with low power and cooling requirements. Using interconnects satisfying the SATA-2 standard in embodiments of the present invention increases functionality and offers the 7-pin data connector per SD, as well as a lower power solution. SAS technology may be advantageous when used in implementations of the present invention because, assuming SAS can use the same connector cables and requirements as SATA, the benefits of SATA can be gained while also using the richness and reliability/serviceability of the SCSI command set. FC SDs have different power and lower pinout requirements giving FC SDs an advantage over SCSI or parallel ATA SDs. FC can be used in implementations of the present invention and are lightweight, durable and easy to implement within the package. FC also has high-speed data transfer properties over long distance and is only slightly affected by electrical noise and environmental factors.

Figure 3:
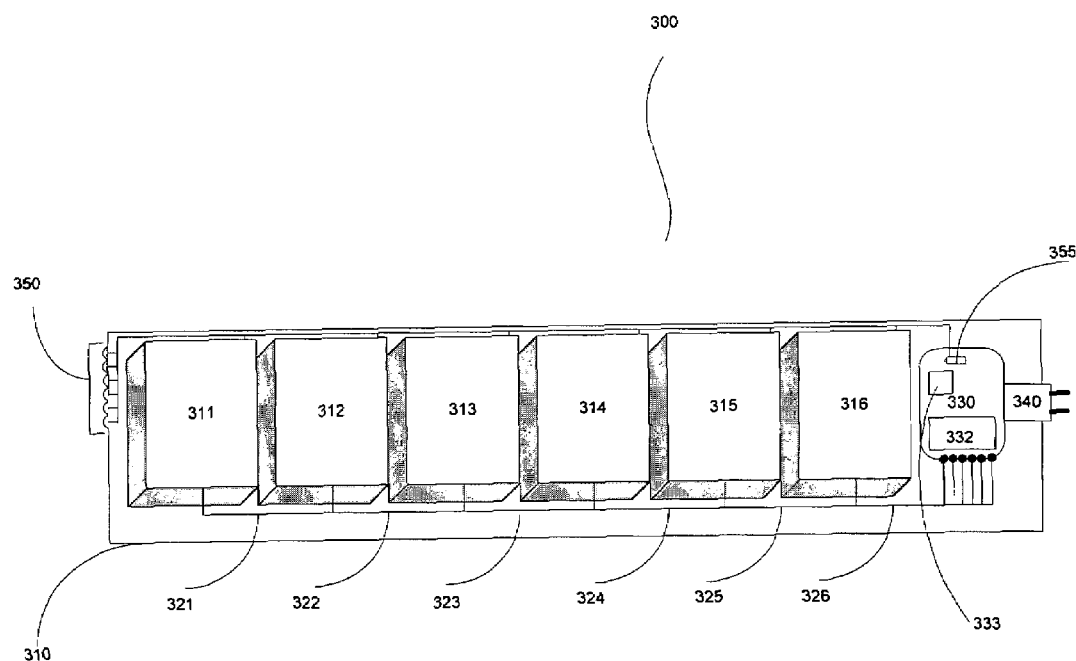
FIG. 3 shows an example of six vertically situated SDs in a carrier housing of a package in accordance with the present invention.

FIG. 3 shows an example of six vertically situated SDs 311, 312, 313, 314, 315 and 316, in carrier housing 310 of package 300 in accordance with the present invention. Each of the six SDs 311-316 are inserted laterally into package 300 oriented vertically and are situated side-by-side. Each SD is connected to carrier housing SD connections 321, 322, 323, 324, 325 and 326, respectively. Carrier housing SD connections 321-326 are routed to address aggregator 330 where information is received and generated. Package 300 receives information from external sources via external connection. External connectors 340 are designed to connect to the storage system, which enables storage system package aggregation. Address aggregator 330 includes a processor 332 and a memory 333 for virtualizing logical addresses of the multiple SDs 311-316 as at least one aggregate volume to provide a layer of abstraction to the SDs 311-316.

Additionally, the package may incorporate failure indications lights 350, one for each SD 311-316, and may be battery powered from a small battery 355 inside the address aggregator 330. Advantages to vertically situated SDs in a package include allowing for a large air channel to flow from front to back of the package across the body of the drives to allow cooling, aggregating the connections by using guided cables, integrated board or wired backplane is easier because the example connectors and cables may rest at the bottom of the package, and light path diagnostics to the front of the package from each SD are easier to perform because all come out at the top of the package.

Figure 4:
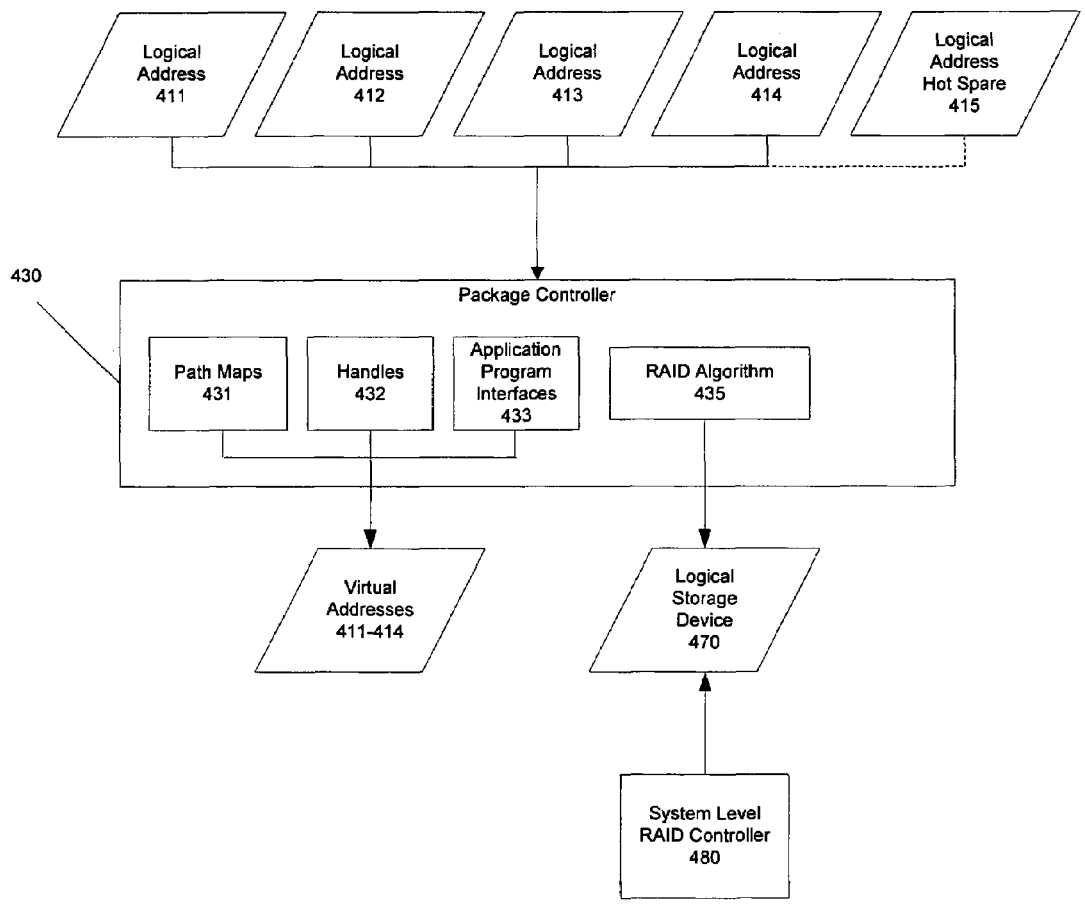
FIG. 4 is a block diagram showing various methods that a controller, in accordance with embodiments of the present invention, may hide physical addresses of SDs.

FIG. 4 is a block diagram showing various methods that controller 430, in accordance with embodiments of the present invention, may hide physical addresses of SDs. For example, physical addresses converted into logical addresses 411-415 may be hidden by adding a layer of indirection using path maps 431, handles 432 or application program interfaces 433. Package controller 430 virtualizes logical addresses 411-415 of the multiple storage devices as at least one aggregate volume 470 to the system controller 480. Additionally, controller 430 may present the logical addresses of SDs 411-415 in a package to appear as one logical storage device 470 to external devices using a desired RAID arrangement 435. This allows for external devices to focus then on the task to be completed instead of on the multiple SDs 411-415.

Figure 5:
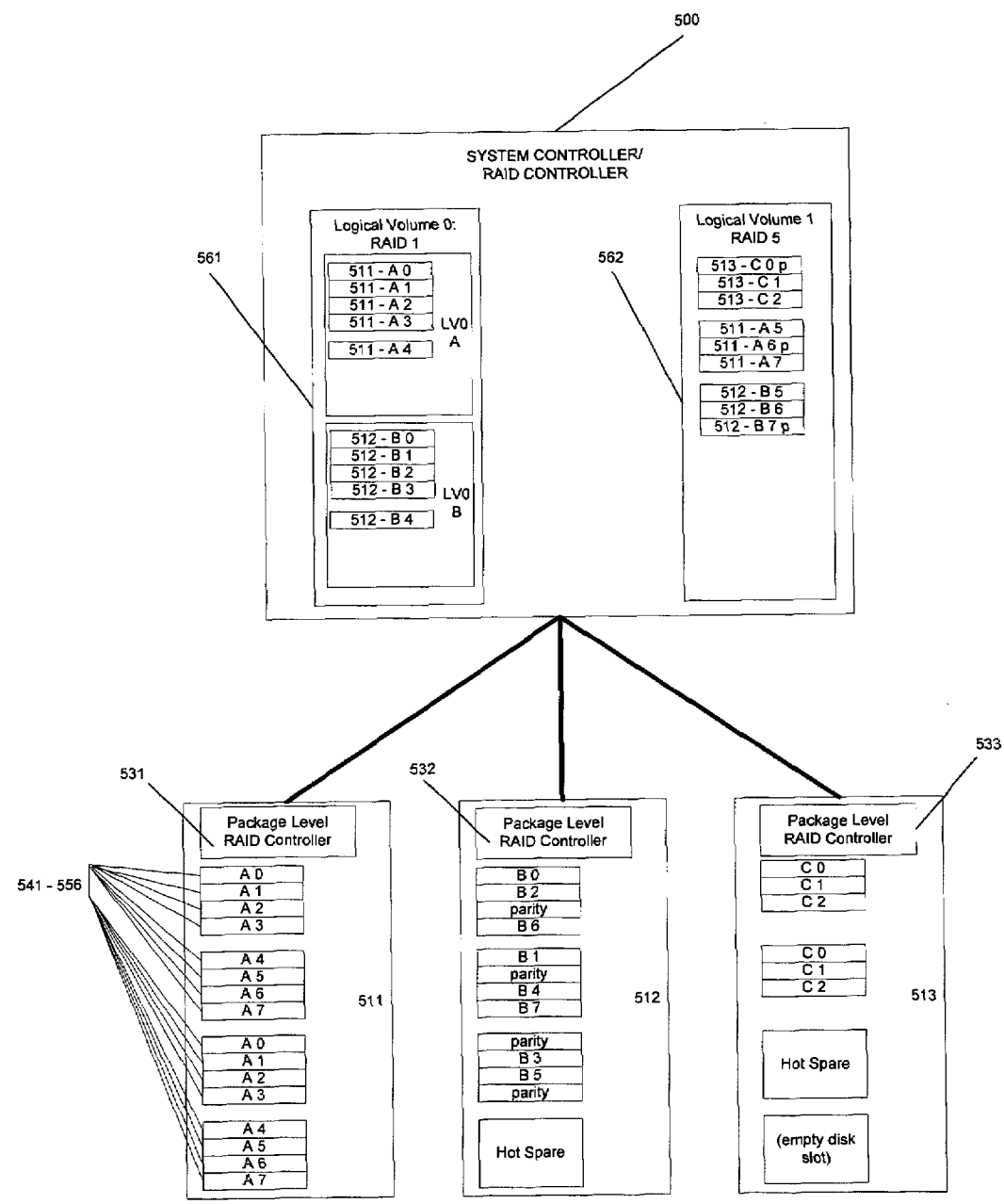
FIG. 5 shows an example embodiment of a package controller incorporating a RAID controller to achieve a desired system level RAID arrangement using three package, and package level RAID controllers to achieve package level RAID using multiple SDs within each package.

FIG. 5 shows a storage system according to an embodiment of the present invention. In FIG. 5, the storage system includes a system controller 500 and multiple packages 511-513. Each of the packages includes a package level RAID controller 531-533 to achieve a desired package level RAID arrangement. The system controller 500 provides system level RAID across the plurality of packages 511-513.

In FIG. 5, package 511 contains 4 disks arranged in a RAID 1 configuration across all 4 disks. Thus the segment labels correspond to the logical volume presented by the RAID controller, for example A0-A7 541-556, each segment label appearing twice—once on each of two disks, to convey the RAID 1 configuration. Package 512 shows a RAID 5 configuration with a hot spare in the $4^{th}$ disk slot. All of the segments are labeled in series with the same letter, except for the parity segments. Package 513 shows a RAID 1 configuration over 2 disks, with a hot spare in the package and an empty disk slot.

Logical Volume 0 561 is a RAID 1 volume (mirrored pair) composed of 5 segments from each of the logical volumes presented by Packages 511 and 512, wherein those of 511 form volume A of the RAID 1 configuration and those of 512 form volume B of the RAID 1 configuration. Thus, the enclosure will present Logical Volume 0 as 5 segments in size. Logical Volume 1 562 is a RAID 5 volume composed of 9 segments, 3 each from the logical volumes presented by Packages 511, 512, 513. Note that some segments have 'p' designations as they are parity segments. Thus the enclosure will present Logical Volume 1 as 6 segments in size.

Thus, in FIG. 5 there are four layers because the hard disk carrier 511 is transformed into an intelligent "package" that holds multiple disks. The "package" 511 is like a sub-enclosure level enclosure. Thus, the hierarchy becomes M disks at the first layer 1, which are included in a package 511 at a new layer, i.e., layer 2. N packages (new layer 2) are provided to one enclosure to form layer 3. P enclosures (layer 3) are provided to a RAID controller, which is layer 4.

In contrast, there are 3 levels in a typical storage subsystem hierarchy, with a many to one relationship for each level to the one above. This hierarchy includes N disks at the first layer, which are provided in an enclosure, i.e., layer 2. There are P enclosures (layer 2), which are provided to a single RAID controller at layer 3. Sometimes the $2^{nd}$ and $3^{rd}$ layers are combined, so that an enclosure includes a RAID controller, but again the typical implementation is to then to daisy-chain this "smart" enclosure to several "dumb" enclosures, those without RAID controllers.

Further, complex RAID implementations, such as RAID 51, are usually composed of a set of 'address filters' implemented in software in the typical layer 3 RAID controller, i.e., RAID controller 500. The RAID controller 500 gets a data request and passes it through its software filters to turn the single request into x actual requests, where x is influenced by the nature of the command, the RAID algorithm, and the number of disks in the RAID group. Thus, while RAID 51 is thought of as a RAID 5 stripe layered over a RAID 1 group, it is actually implemented as two software components in the RAID controller 500. However, this limits policy decisions and management to what is implemented in the RAID controller 500 itself, and to layers above the RAID controller (host or management application driven).

Nevertheless, in FIG. 5, an additional level of control is provided via the package-level RAID controller 531-533. This hierarchy is M disks (layer 1) to 1 package (layer 2), 1 package (layer 2) to 1 package-level RAID controller (new layer 3), N packages (layers 2-3) to 1 enclosure (layer 4) and P enclosures (layer 4) to 1 RAID controller (layer 5). The additional level of control via the package-level RAID controller 531-533 allows a physical/logical implementation, where RAID 5 or RAID 1 is implemented at layer 3, and the overlay RAID implementation is at layer 5. Table 1 below illustrates this arrangement.

TABLE 1

| Layer No. | Layer Member | Control point |
|---|---|---|
| 1 | M disks | |
| 2 | 1 package | |
| 3 | 1 package-level RAID controller | RAID 5 or 1 |
| 4 | 1 enclosure (with N packages) | |
| 5 | 1 RAID controller (with P enclosures) | RAID 5 or 1 |

The addition of a logical volume control point in the package-level RAID controller 531-533 at layer 3 adds possibilities to layer 3 and to layer 4 that is only seen at layer 5 in today's typical systems. For examples, in addition to the physical/logical RAID layer implementation as discussed above, RAID may be implemented at layer 4. Because each package 511-513 has so many more disks than the 1 of today's carrier, performance is greater and some level of RAID control or policy may be added to every enclosure. More specifically, an enclosure could present a logical volume, which was RAID 1 across two packages, each of which was RAID 5 on its internal disks. This 'RAID 15' volume will have double the read performance of a single package, while limiting the write penalty (having to turn each single incoming write to 2 writes, 1 to each package) to the enclosure level. This high level of data protection/load leveling is achieved without any additional traffic on the external storage networking link (FC, SATA, SAS). Of course other RAID mixes are possible, such as 'RAID 11', where a 4 disk package mirrored all the data from the 1st 2 disks to the second 2 disks, and the enclosure managed this package in a pair with a similarly configured mirror package.

An enclosure could also assign priority to certain logical volumes presented through its external interface, and ensure that these volumes were always actually stored in 2 or more places (on 2 or more packages in the simple case). Given a disk failure in one package, the enclosure could (potentially) engage the hot spare in the package.

Actually, the decision to engage the hot spare could be made entirely at the package level, with little or no report to the enclosure. This in itself is a policy point, driving probable implementation of multiple failure modes at the package level—engaging the hot spare would just be a 'degraded' state instead of out-right failure. Migration of the volume to a part of a different package or to a hot spare package within the enclosure may also be initiated, ensuring that if another disk fails, there would still be 2 copies of the data (at migration completion).

Figure 6:
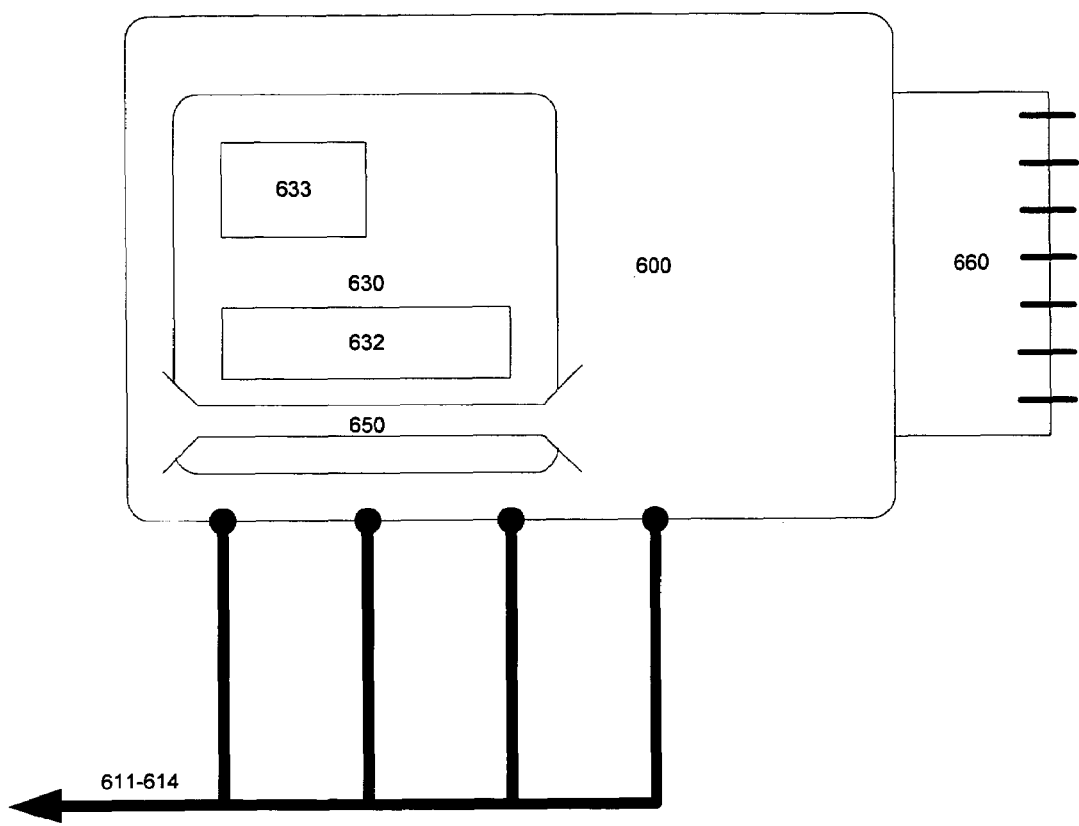
FIG. 6 is a drawing of a controller that is incorporated into a device such as an address aggregator.

FIG. 6 is a drawing of a controller according to an embodiment of the present invention. In FIG. 6, the controller 630 may be implemented within an access device 600. Access device 600 may be configured to provide structured access to physical addresses of the multiple storage devices and providing access to each of the multiple storage devices over one connection. Moreover, the access device 600 may aggregate the physical addresses of the storage devices into logical addresses and make the logical addresses available over one connection. While in FIG. 6 the controller 630 is shown as a part of the access device 600, those skilled in the art will recognize that the controller and the access device may be implemented separately.

Controller 630 may also include a processor 632 and memory 633. Controller 630 may also use pass-through mechanism 650 to allow each storage device in the package to be separately addressable via address lines 611-614. Thus, in instances where the controller 630 need not be part of a process, the pass-through mechanism 650 can mask the presence of controller 630 allowing each storage device to be addressed individually. External connectors 660 are designed to connect to the storage system.

Figure 7:
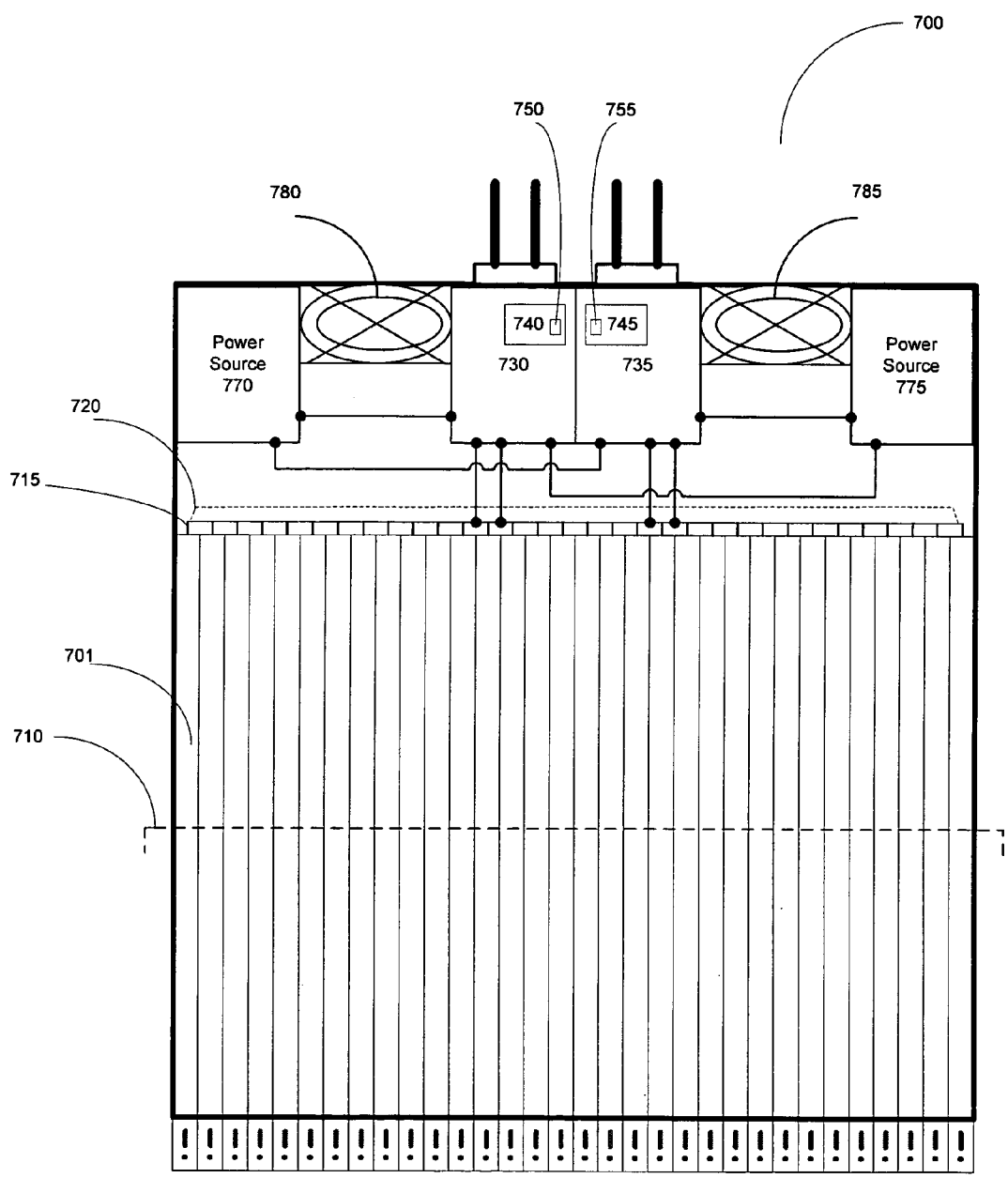
FIG. 7 is a drawing of storage system housing 32 fully assembled packages.

FIG. 7 is a drawing of storage system 700 housing 32 fully assembled packages 710. Packages having external connectors 715 engage with the storage system using package connectors 720. Several types of package connectors 720 may be used to connect a package 701 to storage system 700 including: serial advanced technology attachment (SATA) hard drive interconnects, SATA-2 interconnects, serial attached SCSI (SAS) technology, and arbitrated loop or switched Fibre Channel (FC). The advantages of using the above-mentioned connectors are the same as the advantages described for internal connectors used to connect the SDs to the controller within the carrier housing.

Storage system 700 housing power sources 770 and 775, cooling fans 780 and 785, package aggregators 730 and 735, multiple packages 710 and package connectors 720. Storage system 700 communicates to the multiple packages 710 using package aggregators 730 and 735 coupled to the multiple packages using package connectors 720. Package aggregators 730 and 735 allow for high-density storage by connecting to each of the packages to provide power, signaling and system level controllers 740 and 745 configured for implementing a desired storage system configuration. Package controllers 740 and 745 may optionally be configured to control logical volume aggregation, and may further be configured to present a desired RAID configuration across the aggregated logical volume by incorporating RAID controllers 750 and 755 in system controllers 740 and 745, respectively. Additionally or alternatively, RAID controllers 750 and 755 may present a desired RAID configuration using a plurality of the packages 710. The previously described package level RAID and storage system level RAID allows the storage system to provide multiple RAID levels.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A high density storage system, comprising:
   a housing configured for installation in a multiple housing, system-level RAID controller package;
   a plurality of storage devices, each of the plurality of storage devices arranged linearly within the housing from a front of the housing to a back of the housing to provide a high density storage system form factor having a width substantially corresponding to a dimension of one of the plurality of storage devices; and
   a sub-system controller, disposed within the housing, for providing a sub-system level RAID configuration to only the plurality of storage devices disposed within the housing.

2. The high density storage system of claim 1, wherein the plurality of storage devices are arranged horizontally end-to-end.

3. The high density storage system of claim 1, wherein the plurality of storage devices are arranged vertically side-by-side.

4. The high density storage system of claim 1, wherein the width of the high density storage system substantially corresponds to a height of one of the plurality of storage devices.

5. The high density storage system of claim 1, wherein the width of the high density storage system substantially corresponds to a width of one of the plurality of storage devices.

6. The high density storage system of claim 1, wherein the sub-system controller is further configured to provide a hot spare storage device held in the housing for use when one of the plurality of storage devices within the housing fails.

7. The high density storage system of claim 1, wherein the housing is configured to have a minimum width.

8. The high density storage system of claim 1, wherein the housing further comprises fault indicators for providing notification of a fault condition for a storage device within the housing.

9. A storage system, comprising:
   a system-level RAID controller package configured for implementing a desired system level RAID configuration;
   a plurality of high density storage systems, disposed within the system-level RAID controller package, each of the plurality of high density storage systems comprising
   a housing;
   a plurality of storage devices, each of the plurality of storage devices arranged linearly within the housing from a front of the housing to a back of the housing to provide a high density storage system form factor having a width substantially corresponding to a dimension of one of the plurality of storage devices; and
   a sub-system controller, disposed within the housing, for providing a sub-system level RAID configuration to only the plurality of storage devices disposed within the housing; and
   a package aggregator, coupled to the plurality of high density storage systems, for providing connections to each of the plurality of high density storage systems for power, control and signaling.

10. The storage system of claim 9, wherein the plurality of storage devices are arranged horizontally end-to-end.

11. The storage system of claim 9, wherein the plurality of storage devices are arranged vertically side-by-side.

12. The storage system of claim 9, wherein the width of the high density storage system substantially corresponds to a height of one of the plurality of storage devices.

13. The storage system of claim 9, wherein the width of the high density storage system substantially corresponds to a width of one of the plurality of storage devices.

14. The storage system of claim 9, wherein the system-level RAID controller package is configured to provide a system-level RAID logical configuration across the plurality of plurality of high density storage systems.

15. A method for providing a high density storage package, comprising:
    providing a housing configured for installation in a multiple housing, system-level RAID controller package;
    providing a plurality of storage devices, each of the plurality of storage devices arranged linearly within the housing from a front of the housing to a back of the housing to provide a high density storage system form factor having a width substantially corresponding to a dimension of one of the plurality of storage devices; and
    providing a sub-system controller, disposed within the housing, to present a sub-system system level RAID configuration to only the plurality of storage devices disposed within the housing.

* * * * *